Sept. 23, 1947.   M. F. REILLY   2,427,810
STEAM ENGINE VALVE GEARS OF THE COMBINATION OR WALSCHAERT TYPE
Filed April 8, 1946
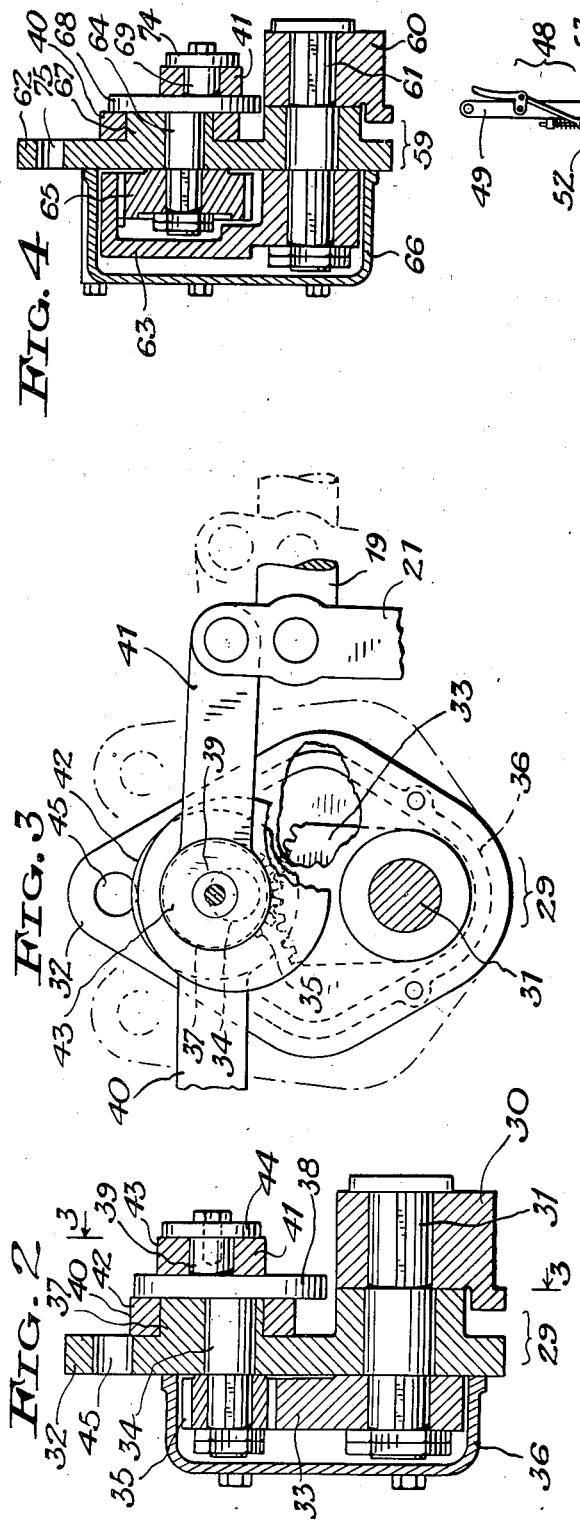
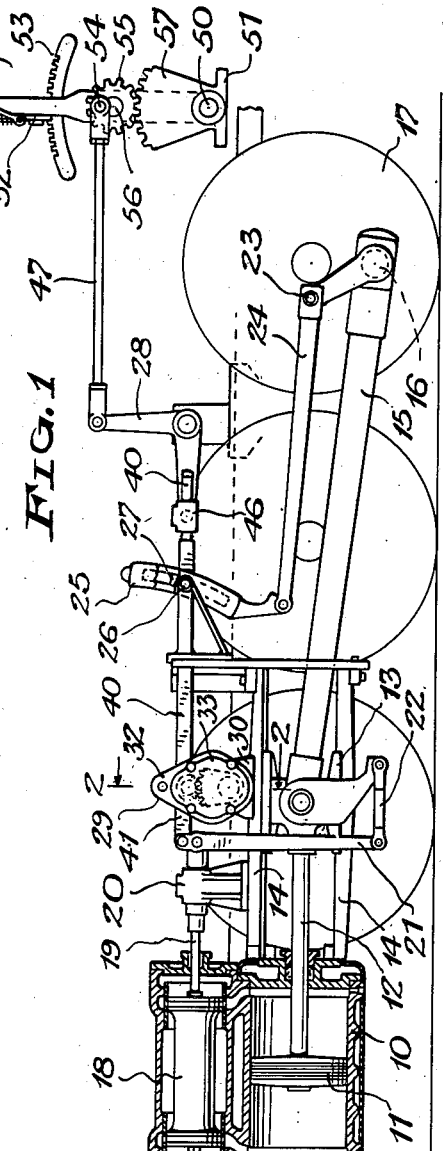
INVENTOR
MICHAEL F. REILLY
BY Christopher L. Waal
ATTORNEY Patented Sept. 23, 1947

2,427,810

UNITED STATES PATENT OFFICE 2,427,810

STEAM ENGINE VALVE GEAR OF THE COMBINATION OR WALSCHAERT TYPE

Michael F. Reilly, Milwaukee, Wis.

Application April 8, 1946, Serial No. 660,345

7 Claims. (Cl. 121—163)

1

The present invention relates to valve gears for steam engines and the like.

In a conventional steam engine valve gear, such as the Walschaert and other types commonly used on steam locomotives, the displacement of the steam cylinder valve takes place with approximately simple harmonic motion. Under some conditions there is a tendency toward wire-drawing or throttling because of the relatively low rate of valve travel when the valve is opening, resulting in loss of engine efficiency.

One of the objects of the present invention is to provide a valve gear for steam locomotive engines and other engines which is arranged to produce a relatively rapid valve opening, so as to improve steam distribution and operating efficiency.

Another object is to provide an engine valve gear which shall permit the use of a smaller lead than usual while still avoiding wire-drawing.

A further object is to provide an improved valve controlling mechanism which can readily be embodied in existing types of valve gears to accelerate the opening movement of the valve.

A still further object is to provide an engine valve gear which shall facilitate the actuation of the reverse lever.

The invention further consists in the several features hereinafter described and claimed.

In the accompanying drawings, illustrating certain embodiments of the invention, Fig. 1 is a side view, partly in section, of a locomotive valve gear embodying the improvements of the invention, parts being shown schematically;

Fig. 2 is a sectional view taken generally on the line 2—2 of Fig. 1;

Fig. 3 is a sectional view taken generally on the line 3—3 of Fig. 2, and

Fig. 4 is a view similar to Fig. 2, but showing a modified form of mechanism.

In the drawings, Fig. 1 shows a steam locomotive engine with a valve gear of the Walschaert type modified to embody the invention. The engine comprises the usual double-acting steam cylinder 10 in which reciprocates a piston 11 having a piston rod 12 connected to a cross-head 13 slidable along one or more guides 14. A connecting rod 15 connects the cross-head with a crank-pin 16 on one of the driving wheels 17. The admission and exhaust of steam with respect to the steam cylinder is controlled by a slide valve 18, here shown to be a piston valve of the inside admission type. A valve stem 19 is attached to the valve and has its outer portion supported by a guide 20 and pivotally connected to a com-

2 bination lever 21, the lower end of which is connected to the cross-head 13 by a union link 22. The cranked driving wheel carries an eccentric pin 23 spaced 90° from the crank pin 16 and connected by an eccentric rod 24 with the lower end of a rockably mounted arcuately slotted radius link 25 fulcrumed at 26, a link block 27 being slidable along the link. In the conventional Walscheart gear of the inside admission type a radius bar has one end pivotally connected to the upper end of the combination lever and the other end portion to the link block, and the block-carrying end of the radius bar is suitably shifted, as by a bell-crank lever 28, to dispose the block at various points along the slotted radius link so as to vary the point of cut-off and also to change the direction of engine rotation. The construction thus far described is of a well-known type and effects operation of the valve with approximately simple harmonic motion.

In accordance with the present invention the motion of the valve is modified to effect more rapid opening and closing of the valve. For this purpose a motion modifying device, designated generally by the numeral 29, is introduced in the connection between the valve and the eccentric, preferably between the link block and the combination lever in the case of a valve gear of the Walschaert type. The motion modifying device is here shown to include a base 30 rigidly secured to a suitable support, such as the upper cross-head guide 14, and carrying a stationary horizontal pin 31 extending transversely of the direction of valve travel. A rock lever 32 is pivotally carried on an intermediate portion of the pin and is confined between the base and a sector gear 33 fixed on the outer end of the pin. A shaft 34 is journaled in the lever 32 in parallel relation to the pin 31 and carries a planet pinion 35 which meshes with the stationary sector gear 33. The gear and pinion are enclosed by a protective lubricant housing 36 secured to the outer side of the lever 32. The inner side of the lever carries a boss 37 surrounding the shaft 34, the axis of the boss being at a greater radius from the axis of the pin 31 than is the axis of the shaft. A crank disk 38 is formed on the inner end of the shaft and carries a crank-pin 39. The conventional radius bar of the Walschaert gear is replaced by a similar radius bar 40 and a valve rod 41. The radius bar 40 pivotally connects the radius link block 27 with the lever 32, the bar having a head or strap 42 surrounding the lever boss 37 and laterally confined thereon as by the crank disk 38. The rod 41 pivotally connects the upper end of the combination lever 21 with the crank-pin 39 on the lever shaft 34 and has a head 43 laterally confined on this pin by a washer 44.

With the valve 18 in its mid-position and the reverse lever 49 in mid-gear, as shown in Fig. 1, the rock lever 32 extends vertically, the axes of the pin 31, boss 37 and pin 39 lying in the same vertical plane. This relation is also shown in Fig. 3, which further shows extreme positions of the lever in broken lines. The swing of the lever 32 on each side of vertical is preferably small, say 20 to 25°, and the gear ratio of the gearing 33, 35 is so selected that the crank 39 turns through an angle of about 90° on each side of vertical, although this is not critical. In some instances, it is desirable to increase the distance from the axis of the pin 31 to the axis of the pivoted end of the radius bar 40, and for this purpose the lever 32 is provided with a pivot pin opening 45, the radius bar end being then suitably shaped for such connection.

The block-carrying end of the radius bar is raised and lowered by means including the bellcrank 28, one arm of which carries a pivoted block 46 in which the radius bar 40 is slidable. The upwardly projecting arm of the bell-crank is pivotally connected by a reversing rod 47 to an actuating device 48, here shown to include a hand lever 49 pivoted on a pin 50 on a base bracket 51. The lever 49 is held in angularly adjusted position by the usual latch 52 engageable with a notched quadrant 53. The reversing rod 47 is not connected directly to the lever but to a crank-pin 54 on a planet pinion 55 journalled on a pin 56 on the lever and meshing with a stationary sector gear 57 secured to the bracket 51. In its mid-gear position the lever 48 extends vertically as shown in Fig. 1, and the crank-pin 54 is at its greatest radius with respect to the lever pivot 50. By this arrangement the effective radius of the crankpin 54 with respect to the lever pivot 51 is gradually reduced as the lever is swung to either extreme position, thus facilitating the operation of the reverse gear. In a conventional type of manually actuated reverse lever considerable manual effort is required to move the lever in the end portions of its travel.

The operation of the valve gear is generally similar to that of a Walschaert gear except that the radius bar 40 oscillates the rock lever 32, and the valve rod 41 has a somewhat faster travel than the radius bar in the middle range of valve travel, causing a more rapid opening of the valve and thus improving the steam distribution. Near each end of the travel of the rock lever, the crank-pin 39 is moving approximately vertically, so that its angular velocity (referred to the pivotal axis of the lever) is approximately the same as that of the lever.

The modified form of valve-controlling mechanism 59 shown in Fig. 4 is generally similar to the mechanism 29 and comprises a base 60 carrying a stationary horizontal pin 61 on which a rock lever 62 is pivotally mounted. A stationary sector gear 63 of the internal type is rigidly secured to the pin and meshes with a pinion 65 on a shaft 64 journalled in the lever, the gear and pinion being enclosed by a housing 66 secured to the lever. The shaft 64 passes through an eccentric boss 67 on the lever and has a crank disk 68 carrying a crank-pin 69. In the midposition of the rock lever the crank-pin 69 is at its lowest position. The front end of the radius bar 40 pivotally engages the boss 67, and the rear end of the rod 41 pivotally engages the crank-pin 69 and is laterally confined by a washer 74. If desired, the rock lever may also have a pin opening 75 near its outer end to provide an alternative connection for the radius link. In the mechanism 59 the internal gearing provides a favorable tooth contact, and the component of vertical movement of the crank-pin 69 is reduced as the path of travel of the crank-pin is concave upward whereas the path of travel of the shaft 64 is concave downward. The mechanism 59 is otherwise similar in operation to that of the mechanism 39.

In some instances the reversing mechanism 48 may be modified to include an internal planetary gearing like that of Fig. 4.

What I claim as new and desire to secure by Letters Patent is:

1. In an engine valve gear, a reciprocatory double-acting valve, a swingably mounted member movable in opposite directions from a middle position, engine-actuated means for oscillating said member, a stationary gear coaxial with said member, a pinion rotatably carried by said member and meshing with said gear, and means connecting said pinion and valve comprising a valve-actuating member having a pivotal connection with said pinion eccentric to said pinion, said pivotal connection having an angular travel about the axis of said pinion and positioned to provide its maximum valve-displacing velocity when said swingably mounted member passes through its middle position.

2. In an engine valve gear, a reciprocatory double-acting valve, a swingably mounted member movable in opposite directions from a middle position, engine-actuated means for oscillating said member, a stationary gear coaxial with said member and having external teeth, a pinion rotatably carried by said member and meshing with said gear, and means connecting said pinion and valve comprising a valve-actuating member having a pivotal connection with said pinion eccentric to said pinion, the axis of said pivotal connection being at its greatest radius from the pivotal axis of said swingable member when said member is in its middle position.

3. In an engine valve gear, a reciprocatory double-acting valve, a swingably mounted member movable in opposite directions from a middle position, engine-actuated means for oscillating said member, a stationary gear coaxial with said member and having internal teeth, a pinion rotatably carried by said member and meshing with said gear, and means connecting said pinion and valve comprising a valve-actuating member having a pivotal connection with said pinion, the axis of said pivotal connection being at its smallest radius from the pivotal axis of said swingable member when said member is in its middle position.

4. In an engine valve gear, a swingably mounted member, engine-actuated means for oscillating said member, a stationary gear coaxial with said member, a pinion rotatably carried by said member and meshing with said gear, and a valve-actuating member having a pivotal connection with said pinion eccentric to said pinion.

5. In an engine valve gear, a swingably mounted member, a stationary gear coaxial with said member, a pinion rotatably carried by said member and meshing with said gear, and motion-transmitting means having a pivotal connection with said gear eccentric to the pivotal axis of said gear.

6. In an engine valve gear, a swingably mounted member, a stationary gear coaxial with said member, a shaft rotatably carried by said member in parallel relation to the pivotal axis of said member, a pinion on said shaft meshing with said gear, a housing on said member for enclosing said gear and pinion, and motion-transmitting means having a pivotal connection with said shaft eccentric to the pivotal axis of said shaft.

7. In an engine valve gear having a reciprocatory valve and valve-actuating mechanism including a combination lever connected to said valve and a block shiftable along a rockable radius link, a swingably mounted member, a stationary gear coaxial with said member, a pinion rotatably carried by said member and meshing with said gear, a radius bar connecting said block and swingably mounted member, and a rod pivotally connecting said combination lever and said pinion, the pivotal connection of said rod to said pinion being eccentric to said pinion and positioned to accelerate the opening movement of the valve.

MICHAEL F. REILLY.

REFERENCES CITED

The following references are of record in the file of this patent:

UNITED STATES PATENTS

| Number | Name | Date |
|---|---|---|
| 282,432 | Aram | July 31, 1883 |
| 2,082,092 | Baker | June 1, 1937 |